(12) United States Patent
Hemingway et al.

(10) Patent No.: US 7,402,292 B2
(45) Date of Patent: Jul. 22, 2008

(54) DEVICE AND METHODS OF AMMONIA GENERATION FOR NOX ABATEMENT

(75) Inventors: Mark D. Hemingway, Columbiaville, MI (US); William J. LaBarge, Bay City, MI (US); Haskell Simpkins, Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 485 days.

(21) Appl. No.: 11/230,158

(22) Filed: Sep. 19, 2005

(65) Prior Publication Data

US 2007/0065354 A1  Mar. 22, 2007

(51) Int. Cl.
*B01D 53/56* (2006.01)
*B01D 53/94* (2006.01)
*B01J 19/24* (2006.01)
*C01C 1/00* (2006.01)
*F01N 3/18* (2006.01)

(52) U.S. Cl. .......... 423/239.1; 423/213.2; 423/213.5; 423/213.7; 423/352; 422/148; 422/149; 422/168; 422/169; 422/170; 422/171; 422/172; 422/177; 422/178; 422/180; 422/181; 60/273; 60/274; 60/282; 60/288; 60/295; 60/299; 60/302; 60/317; 60/324

(58) Field of Classification Search .............. 423/213.2, 423/213.5, 213.7, 239.1, 352; 422/148, 149, 422/168, 169, 170, 171, 172, 177, 178, 180, 422/181; 60/273, 274, 282, 288, 295, 299, 60/302, 317, 324
See application file for complete search history.

(56) References Cited

U.S. PATENT DOCUMENTS

| 6,017,503 A | * | 1/2000 | Kato et al. .................. 423/235 |
| 6,334,986 B2 | | 1/2002 | Gieshoff et al. |
| 7,213,395 B2 | * | 5/2007 | Hu et al. ....................... 60/286 |
| 2002/0073692 A1 | | 6/2002 | Katashiba et al. |
| 2004/0136890 A1 | | 7/2004 | Lang et al. |
| 2004/0237507 A1 | | 12/2004 | Duvinage et al. |
| 2005/0019244 A1 | * | 1/2005 | Spiegelman et al. ........ 423/352 |
| 2007/0033928 A1 | * | 2/2007 | Hu et al. ....................... 60/286 |
| 2007/0274892 A1 | * | 11/2007 | Duvinage et al. ........ 423/239.2 |

FOREIGN PATENT DOCUMENTS

| DE | 19510804 | 9/1996 |
| EP | 0 773 354 B1 | 7/1996 |
| EP | 1 023 935 B1 | 1/2000 |
| JP | 3194111 | 8/1991 |
| WO | WO 00/76637 A1 | 12/2000 |
| WO | WO 01/14698 A1 | 3/2001 |
| WO | WO 02/094420 A1 | 11/2002 |
| WO | WO 02/100519 A1 | 12/2002 |
| WO | WO 03/009925 A1 | 6/2003 |

* cited by examiner

*Primary Examiner*—Timothy C Vanoy
(74) *Attorney, Agent, or Firm*—Paul L. Marshall

(57) ABSTRACT

One embodiment of a method of operating a NOx abatement system comprises: introducing an exhaust stream to an ammonia generator in a normal flow direction, adsorbing NOx from the exhaust stream in the ammonia generator, diverting the exhaust stream around the ammonia generator, introducing hydrogen to the ammonia generator in a direction opposite the normal flow direction, and generating ammonia within the ammonia generator.

20 Claims, 1 Drawing Sheet

DEVICE AND METHODS OF AMMONIA GENERATION FOR NOX ABATEMENT

BACKGROUND

This disclosure generally relates to devices, systems, and methods for the remediation of NOx emissions generated from internal combustion engines. More specifically, this disclosure relates to ammonia generating devices for use in NOx abatement applications.

It is well known that internal combustion engines produce undesirable by-products as a consequence of burning hydrocarbon fuels (e.g. gasoline, diesel fuel, and the like) such as; carbon monoxide (CO), carbon dioxide ($CO_2$), unburned hydrocarbons (HC) and nitrogen oxides (NOx). As regulations governing the emission of these by-products become increasingly more stringent, developing NOx abatement systems to achieve these mandates are of great importance. Although significant advancements have been achieved in reducing CO and HC emissions, further developments are needed to decrease NOx emissions.

Selective catalytic reduction catalysts (SCR's), for example, have shown promise at achieving this goal. These devices are capable of storing ammonia ($NH_3$) for the subsequent reduction of nitrogen oxides (NOx) into hydrogen ($H_2$) and water ($H_2O$). These devices have proven to be exceptionally efficient at reducing NOx, however carrying liquid ammonia for injection into the exhaust stream is cumbersome and costly. As a result, the development of "on-board" generation of ammonia has become imperative to the success of these devices and their benefits of reducing NOx emissions.

An ammonia generator is disclosed herein that utilizes a catalytic substrate to react a reformate produced by an off-line fuel reformer with the exhaust stream of an internal combustion engine to produce ammonia. Furthermore, a NOx abatement system employing this ammonia generator has been designed which maximizes system efficiency.

BRIEF SUMMARY

Disclosed herein are ammonia generating devices, NOx abatement systems comprising ammonia generating devices, and methods for using the same.

In one embodiment an ammonia generator is disclosed which comprises a shell and a catalyst bed, which is housed within the shell. The catalyst bed comprises a substrate and a catalyst. The catalyst comprises a catalytic metal capable of reacting NOx and hydrogen to form ammonia, and a material capable of adsorbing NOx. The catalytic metal is present in an amount of 100 $g/ft^3$ to 260 $g/ft^3$ ruthenium, and comprises 10 $g/ft^3$ to 50 $g/ft^3$ platinum.

In another embodiment disclosed herein, a NOx abatement system comprises an ammonia generator comprising an inlet end and an outlet end, an exhaust conduit which is connected in fluid communication to the inlet end, a mixture conduit which is connected in fluid communication to the outlet end, a by-pass circuit connected in fluid communication to the exhaust conduit on a first end and connected in fluid communication to the mixture conduit on a second end, a reformer, which is capable of producing a reformate and connected to said mixture conduit between the second end and the outlet end; and, a valve capable of directing and inhibiting the flow of fluids, which is disposed in the mixture conduit at a position capable of inhibiting flow of a fluid stream from the by-pass circuit into the ammonia generator and capable of directing the reformate into the ammonia generator.

In yet another embodiment, a method of operating a NOx abatement system is disclosed comprising; introducing an exhaust stream to an ammonia generator in a normal flow direction, adsorbing NOx from the exhaust stream in the ammonia generator, diverting the exhaust stream around the ammonia generator, introducing hydrogen to the ammonia generator in a direction opposite the normal flow direction; and generating ammonia within the ammonia generator.

The above described and other features are exemplified by the following figures and detailed description.

BRIEF DESCRIPTION OF THE DRAWINGS

Refer now to the figures, which are exemplary embodiments, and wherein the like elements are numbered alike.

DETAILED DESCRIPTION

Disclosed herein is an ammonia generating device, exhaust system designs, and methods of using the same. The ammonia generating device disclosed is capable of generating ammonia utilizing effluent produced by an internal combustion engine and reformate produced in a fuel reformer. Furthermore, a NOx abatement system has been developed using this ammonia generating device in an arrangement that enhances the efficiency of ammonia production, i.e., reduces the amount of reformate used in the ammonia production. This can be accomplished by temporarily taking the ammonia generating device off-line and passing reformate through the device in a flow direction opposite that of normal flow.

The term "on-board" refers to applications (such as automobiles, trucks, boats, motorcycles, buses, and the like) in which the system is contained within the entity, and is mobile with the entity. This may be any application where such is desirable. In addition, specific quantities and ranges will be discussed herein with respect to compositions. All ranges disclosed herein are inclusive and combinable (e.g., ranges of "up to about 25 wt %, with about 5 wt % to about 20 wt % desired", is inclusive of the endpoints and all intermediate values of the ranges of "about 5 wt % to about 25 wt %," etc). Furthermore, the terms "a" and "an" herein do not denote a limitation of quantity but rather denote the presence of the referenced entity.

Figure 1:
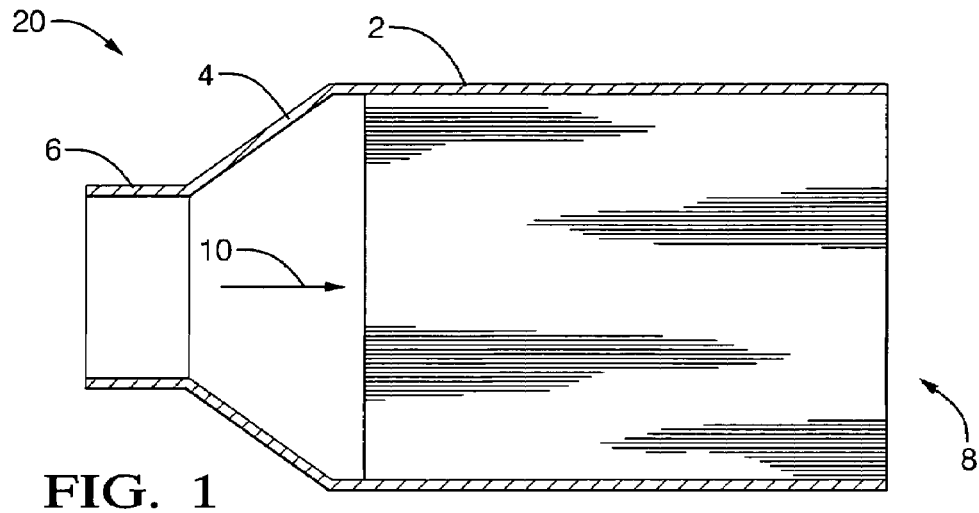
FIG. 1 is a partial cross-sectional illustration of an exemplary ammonia generator.

Referring now to FIG. 1, a partial and cross-sectional view of an exemplary ammonia generator, generally designated 20, is illustrated. Ammonia generator 20 comprises shell 2, which functions to generally support and protect the catalyst bed 8. Shell 2 can have any cross-sectional geometry such as, but not limited to, rounded (e.g. elliptical, circular, and the like). Shell 2 can be connected to cone 4 utilizing any method commonly employed (e.g., welding, stamping, pressing, riveting, peening, and the like). Cone 4 can be attached to snorkel 6 utilizing similar techniques, or shell 2, cone 4, and snorkel 6 can be manufactured from one blank. Materials capable of withstanding the temperatures, corrosion, and wear encountered by such devices can be used for the manufacture of shell 2, cone 4, and snorkel 6. More specifically, ferrous metals or ferritic stainless steels (e.g., marensitic, ferritic, and austenitic stainless materials, and the like) can be utilized.

Supported within shell 2 is catalyst bed 8. Catalyst bed 8 comprises a substrate on which metal oxide(s), catalytic metal(s), and optionally, zeolites are disposed. Catalyst bed 8 can store NOx during lean operating conditions, and utilize the stored NOx to produce ammonia during fuel-rich conditions. The catalytic metal(s) can be employed to promote the production of ammonia. These catalytic metal(s) can comprise metals that promote the conversion of NOx to ammonia. Possible catalysts include, ruthenium, rhodium, iridium, platinum, palladium, gold, silver, and/or oxides, salts, alloys, or combinations comprising at least one of these metals.

In this system, partial conversion of the NOx in the ammonia generator to ammonia is sufficient to attain low NOx emission levels from the system; i.e., due to the design of the present NOx abatement system 40, the ammonia generator 20 can be sized to adsorb a portion of the NOx in the exhaust stream without changing the size of the SCR. More specifically, NOx conversion efficiency of the system can be greater than or equal to 70 volume percent (vol %) conversion, or greater than or equal to 80 vol % conversion, or even greater than or equal to 90 vol % conversion of NOx. For example, the catalytic metal(s) can be chosen such that the resulting catalyst is capable of converting about 20 vol % to about 75 vol %, or more specifically, about 30 vol % to about 65 vol %, or even more specifically, about 40 vol % to about 55 vol % of the NOx entering the ammonia generator to ammonia. For example, if 50 vol % of the NOx entering the ammonia generator is converted to ammonia, the NOx emissions from the system can attain a conversion efficiency of about 88 vol % without changing the size of the SCR.

The ammonia generator can comprise ruthenium (Ru) as a catalytic metal, employing about 100 grams per cubic foot ($g/ft^3$) to about 260 $g/ft^3$, or more specifically about 140 $g/ft^3$ to about 220 $g/ft^3$, or even more specifically about 160 $g/ft^3$ to about 200 $g/ft^3$. Platinum (Pt) can also be present as a catalytic metal, employing less than or equal to about 10 $g/ft^3$, more specifically, about 10 $g/ft^3$ to about 50 $g/ft^3$, or more specifically about 20 $g/ft^3$ to about 40 $g/ft^3$, or even more specifically about 25 $g/ft^3$ to about 35 $g/ft^3$. For example, the ammonia generator can comprise about 60 $g/ft^3$ to about 130 $g/ft^3$ Ru, less than or equal to about 45 $g/ft^3$ Pt, less than or equal to about 5 $g/ft^3$ rhodium (Rh), and less than or equal to about 5 $g/ft^3$ palladium (Pd); or, more specifically, about 70 $g/ft^3$ to about 120 $g/ft^3$ Ru, about 25 $g/ft^3$ to about 35 $g/ft^3$ Pt, no added Rh, and no added Pd. In other words, the ammonia generator can be free of Pd and Rh (i.e., no added Pd and Rh), comprise low amounts of Pt (e.g., less than 70% of the amount of Pt employed in NOx adsorbers, or, more specifically, less than or equal to about 50% of the amount of Pt employed in NOx adsorbers), and sufficient Ru to attain the desired ammonia reaction. NOx adsorbers generally employ about 70 $g/ft^3$ to about 120 $g/ft^3$, Pt; which increases the cost of the device appreciably. Additionally, NOx adsorbers do not form ammonia under normal operating conditions (adsorption or regeneration).

It is noted that the catalytic metal(s) utilized in the ammonia generator are capable of converting NOx to ammonia using reformate. Depending upon the degree of conversion desired and the temperatures employed during the conversion, different combinations of catalytic metal(s) may be employed. The catalytic metals, which can include Ru, Pt, Pd, and the like, as well as combinations comprising at least one of the foregoing, can be employed in various amounts. The amounts can be, for example, 0 to about 260 $g/ft^3$ Ru, 0 to about 260 $g/ft^3$ Pt (e.g., about 1 $g/ft^3$ to about 260 $g/ft^3$ for both Pt and Ru), depending upon the desired operating conditions, concentration and amount of reformate, as well as other factors.

Metal oxide(s) can support the catalytic metal(s), stabilize the support, and/or offer nitrate sites that react and store the acidic NOx gas as nitrate salts. The catalytic metal support can be a metal oxide such as aluminum oxide(s) (e.g., alumina). The metal oxide(s) providing the nitrate sites and/or stabilizing the support can comprise an alkaline earth metal, alkaline metal, rare earth metal, or a combination comprising at least one of the foregoing. More specifically, the metal oxide can comprise a metal such as cerium, neodymium, lanthanum, zirconium, barium, magnesium, cesium, and the like, as well as combinations comprising at least one of the foregoing metals. In order to further enhance the efficiency of the conversion of NOx to ammonia, a metal oxide having a low oxygen capacity (e.g. an oxygen capacity that does not prevent the desired production of $NH_3$)can be employed. The oxygen capacity can be less than an oxygen capacity of ceria. Therefore, neodymium (Nd) oxide can be employed, or, more specifically, the metal oxide can comprise neodymium oxide.

Optionally, zeolite(s) can also be employed in the ammonia generator. The zeolite(s) can be configured to preferentially store ammonia and inhibit storage of oxygen. For example, the zeolite structure can be adjusted to inhibit oxygen storage, while allowing the capture of ammonia. Possible zeolites include Y-type, beta-type, ZSM-5, mordenite, ferrierite, faujisite, and the like, as well as combinations comprising at least one of the foregoing zeolites. The zeolites can be a hydrated aluminosilicate (e.g., stabilized with alkaline metals, alkaline earth metals, lanthanide metals, rare earth metals, and the like, as well as combinations comprising at least one of the foregoing).

The catalyst loading (i.e., the total amount of catalytic metal(s), metal oxide(s), and zeolite(s)) on the substrate can be about 0.005 wt % to about 25.0 wt %. More specifically, the catalyst loading can be about 5 wt % to about 20 wt %, or more specifically, about 10 wt % to about 15 wt % can be employed.

The substrate can comprise any material designed for use in a spark ignition or diesel engine environment and having the following characteristics: (1) capable of operating at temperatures up to about 600° Celsius, and up to about 1,000° Celsius for some applications, depending upon the device's location within the exhaust system (manifold mounted, close coupled, or underfloor) and the types of system (e.g. gasoline or diesel); (2) capable of withstanding exposure to hydrocarbons, nitrogen oxides, carbon monoxide, particulate matter (e.g. soot and the like), carbon dioxide, and/or sulfur; and (3) having sufficient surface area and structural integrity to support a catalyst, if desired. Some possible materials include cordierite, silicon carbide, metal, metal oxides (e.g. alumina, and the like), glasses, and the like, and mixtures comprising at least one of the foregoing materials. These materials can be in the form of foils, preform, mat, fibrous material, monoliths (e.g., a honeycomb structure, and the like), other porous structures (e.g., porous glasses, sponges), foams, pellets, particles, molecular sieves, and the like (depending upon the particular device), and combinations comprising at least one of the porous ultra-low expansion glasses.

Although the substrate can have any size or geometry, the size and geometry can be chosen to optimize surface area in the given exhaust emission control device design parameters. The substrate can have a honeycomb geometry, with the combs' channels having any polygonal or rounded shape, such as square, triangular, pentagonal, hexagonal, heptagonal, octagonal, and similar geometries.

The catalyst(s), metal oxide(s), and /or zeolite(s) can be disposed on and/or throughout the substrate (herein referenced as "on") by a process such as washcoating, imbibing, impregnating, physisorbing, chemisorbing, precipitating, or otherwise applying them to the substrate. The catalyst(s), metal oxide(s), and or zeolite(s), can be simultaneously or sequentially disposed on the surface.

Figure 2:
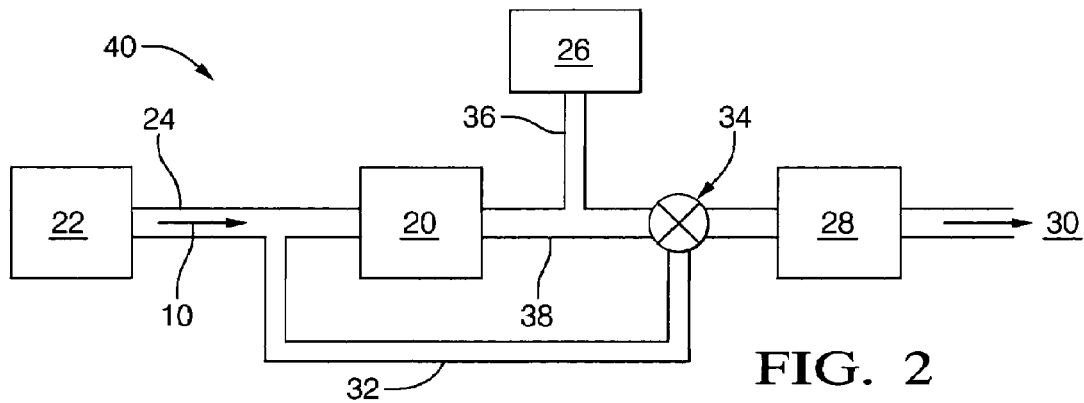
FIG. 2 is a schematic illustration of an embodiment of an exemplary exhaust treatment system.

Referring now to FIG. 2, an exemplary NOx abatement system, generally designated 40, is illustrated. An exhaust source 22 is coupled to and in fluid communication with exhaust conduit 24 wherein exhaust stream 10 flows. Ammonia generator 20 is in fluid communication with an exhaust source 22 and coupled to exhaust conduit 24. By-pass circuit 32 connects to and is in fluid communication with exhaust conduit 24 at a junction disposed between exhaust source 22 and ammonia generator 20.

Ammonia generator 20 is in fluid communication with valve 34 via mixture conduit 38. Reformer 26 is coupled and in fluid communication with reformer conduit 36, which is coupled to and in fluid communication with mixture conduit 38. Valve 34 is coupled to and in fluid communication with by-pass circuit 32. Valve 34 is also coupled to and in fluid communication with SCR 28 via a conduit. SCR 28 is in fluid communication with the environment 30.

The NOx abatement system 40 illustrated in FIG. 2 generally has two modes of operation. The first mode of operation is the fuel-lean condition previously described when the ammonia generating catalyst is storing NOx, hereinafter referred to as the "normal operating mode". The second mode of operation is when the ammonia generator releases NOx during a fuel-rich environment to produce ammonia; hereinafter this mode of operation will be referred to as "regeneration cycle".

During normal operating mode, exhaust source 22 produces an exhaust stream 10 from the combustion of fuel, which flows through exhaust conduit 24, through ammonia generator 20, through valve 34, through SCR 28, and out to the environment 30, as directed by valve 34. During this operation, by-pass circuit 32 is closed to fluid communication at valve 34 and/or a valve disposed upstream from ammonia generator 20 (not shown).

The exhaust stream 10 produced during normal operating mode is generally fuel-lean with an air/fuel ratio (A/F) of greater than or equal to 17 depending on the design of the engine. As this fuel-lean exhaust flows through ammonia generator 20, the catalyst bed 8 stores NOx from the exhaust stream 10.

Downstream SCR 28 comprises a catalytic substrate disposed in fluid communication with the fuel-lean exhaust stream 10 produced during normal operating mode. The catalytic substrate is configured with catalyst(s) capable of storing ammonia for reaction with NOx gases, for example, as shown in the following reactions (I), (II) and (III):

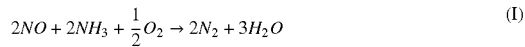

$$2NO + 2NH_3 + \frac{1}{2}O_2 \rightarrow 2N_2 + 3H_2O \quad (I)$$

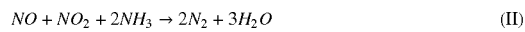

$$NO + NO_2 + 2NH_3 \rightarrow 2N_2 + 3H_2O \quad (II)$$

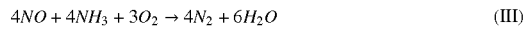

$$4NO + 4NH_3 + 3O_2 \rightarrow 4N_2 + 6H_2O \quad (III)$$

As the normal operating mode progresses, the catalyst bed 8 within ammonia generator 20 becomes saturated with NOx and is regeneration. During regeneration, valve 34 opens fluid communication of by-pass circuit 32 with SCR 28 and closes fluid communication of mixture conduit 38 with SCR 28. This results in the exhaust stream 10 passing from the exhaust source 22, through exhaust conduit 24, through by-pass conduit 32 and valve 34, into SCR 28, and out to the environment 30.

Once the exhaust stream 10 passes through by-pass circuit 32 reformate from reformer 26 can be directed through mixture conduit 38 into ammonia generator 20. Reformer 26 can be any reformer capable of reacting fuel(s) (e.g., gasoline, diesel, ethanol, methanol, kerosene, and the like; gaseous fuels, such as natural fluid, propane, butane, and the like; and alternative fuels, such as hydrogen, biofuels, dimethyl ether, and the like; as well as combinations comprising at least one of the foregoing) and an oxidant(s) (e.g., exhaust gas recycle, oxygen, air, and the like, as well as combinations comprising at lease one of the forgoing). Possible reformer configurations include steam reformer, dry reformer, partial oxidation reformers, as well as combinations comprising at least one of the foregoing.

When the hydrogen rich reformate advances into mixing conduit 38 and into ammonia generator 20, hydrogen (H) and carbon monoxide consume the oxygen in the exhaust fluid to form water and carbon dioxide, as shown by reactions (IV) and (V);

$$4H + O_2 \rightarrow 2H_2O \quad (IV)$$

$$H_2 + CO + O_2 \rightarrow + CO_2 + H_2O \quad (V)$$

As the oxygen is being consumed, the environment shifts from an oxygen rich, fuel-lean environment to an oxygen poor, fuel rich environment, thereby encouraging the release of NOx stored on the ammonia generator's catalyst bed 8.

Once the oxygen has been consumed, the released NOx reacts with the hydrogen in the presence of the catalyst to form ammonia, as shown in the following reactions (VI) and (VII);

$$5H_2 + 2NO \rightarrow 2NH_3 + 2H_2O \quad (VI)$$

$$7H_2 + 2NO_2 \rightarrow 2NH_3 + 4H_2O \quad (VII)$$

From the reactions shown above, (VI) and (VII), it can be seen that two moles of either nitric oxide or nitrogen dioxide can be consumed in the generation of two moles of ammonia. Since conversion of a portion of the released NOx is sufficient to regenerate the SCR 28 and to retain a desired NOx emission from the system, the catalyst composition and loading can be configured accordingly. In other words, the size of the ammonia generator, type of catalyst, and catalyst loading can all be adjusted to maintain the desired emission level as opposed to allow optimal NOx conversion to ammonia.

After a predetermined period of time, and/or as the result of a sensor reading (e.g., NOx sensor), the valve 34 can return the system to it's normal operating mode by opening the fluid communication of mixture conduit 38 with SCR 28 and closing fluid communication of by-pass circuit 32 with SCR 28. During normal operations, the reformer 26 can be returned to a low reformate production state, temporarily shut down, employed to introduce reformation to other system components (not shown) e.g., for regeneration thereof, and/or can be used to produce reformate that can be stored for future use.

When the NOx abatement system 40 returns to the normal operating mode, the flow of the exhaust gas through the ammonia generator resumes. This flow pushes the fluids in the ammonia generator 20 and the conduit 38 to and through SCR 28. As a result, the SCR will receive reformate remaining in the mixing conduit 38 followed by ammonia produced in the ammonia generator 20. Subsequent to the ammonia, the SCR will receive released, unconverted NOx, and then the exhaust stream 10. Hence, the ammonia produced in ammonia generator 20 can regenerate SCR 28 prior to the SCR 28 receiving a high concentration of NOx (i.e., the standard NOx received in the exhaust stream plus the released, unconverted NOx), thereby reducing the potential for NOx slip (i.e., passage of NOx out of the SCR 28). If the SCR 28 does not receive the ammonia prior to the released, unconverted NOx, the NOx can overwhelm the catalytic capacity of the SCR 28, thereby enabling NOx. This is particularly an issue since the SCR 28 can be substantially depleted of ammonia when the system switches back to normal operating mode from regeneration since, during regeneration, the SCR 28 has been receiving all of the NOx in the exhaust stream (i.e., the stream has bypassed the ammonia generator).

It is further noted that, the system can be configured with reformate conduit 36 disposed upstream of ammonia generator 20 without by-pass conduit 32 or valve 34 to allow ammonia generator 20 to be taken off-line during regeneration, regeneration of ammonia generator 20 would be conducted with the full exhaust stream 10 flowing therethrough. As a result, a greater concentration of $O_2$ would be present in ammonia generator 20 and a substantially larger amount of reformate would be used to attain the same reformate concentration in the ammonia generator 20. For example, when the ammonia generator 20 is by-passed during the regeneration, the amount of reformate introduced to ammonia generator 20 can be reduced by greater than or equal to about 70%, or more specifically, by greater than or equal to about 80%, and even by greater than or equal to about 90% or more, compared to the amount of reformate used to attain the same amount of NOx conversion to ammonia without the use of a by-pass circuit.

Furthermore, if reformate conduit 36 was upstream of ammonia generator 20 and the NOx system was configured with by-pass conduit 32 and valve 34, after regeneration the NOx filled gas downstream of ammonia generator 20 (i.e., exhaust comprising non-reacted NOx) would advance to SCR 28, prior to the gas comprising ammonia. Again, posing a situation where SCR 28 could be overwhelmed by NOx when the system is returned to normal operating mode. Nevertheless, this could be overcome, by increasing the catalytic capacity of SCR 28, although this is an inefficient and costly solution. Hence, if the reformate is introduced to the ammonia generator in the normal flow direction, the SCR will not receive the added benefit of receiving the ammonia prior to receiving the released, unconverted NOx.

In addition to the various exhaust emission treatment devices discussed herein; the system can comprise various sensor(s) and/or controllers for controlling the regeneration cycle. For example, an oxygen sensor(s), a $NO_x$ sensor(s), and/or an ammonia ($NH_3$) sensor(s), temperature sensor(s), or the like, can be located throughout the NOx abatement system to measure variables that could enable a device to monitor and/or measure variables such as, $NO_x$ production, NOx efficiency, ammonia concentration, ammonia slip, or the like.

Figure 3:
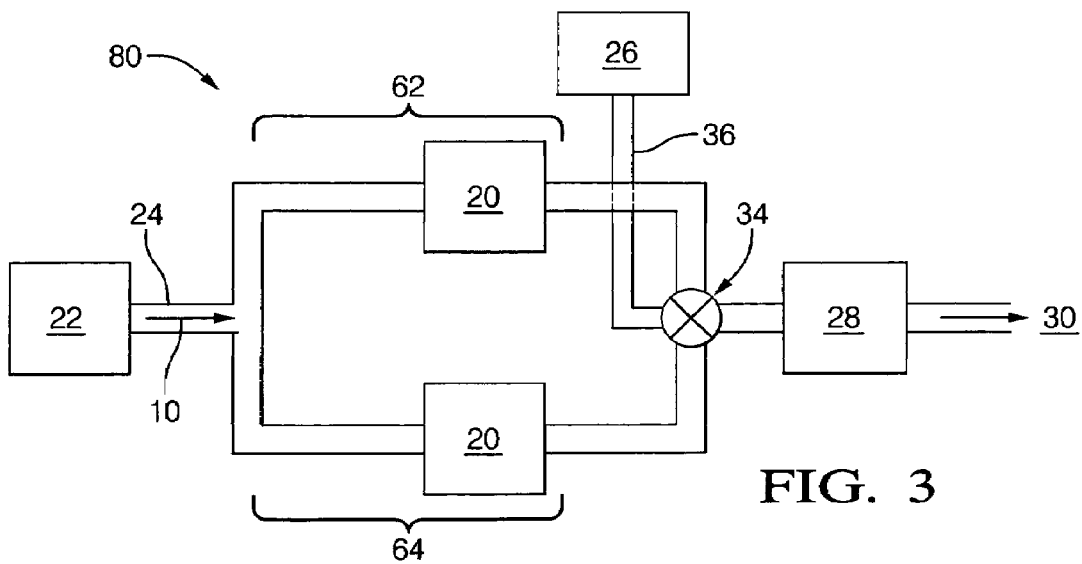
FIG. 3 is a schematic illustration of a second embodiment of an exemplary exhaust treatment system.

Referring now to FIG. 3, an exemplary NOx abatement system, generally designated 80, is illustrated. This embodiment illustrates an exemplary system comprising two ammonia generators 20, which allows for the regeneration of each individual ammonia generator 20 as the alternate by-pass circuit allows passage of the exhaust stream 10 through valve 34, through SCR 28, and to the environment 30.

In the present embodiment, exhaust source 22 is connected to and in fluid communication with exhaust conduit 24. Exhaust conduit 24 divides into two distinct flow paths, by-pass circuit 62, and by-pass circuit 64. By-pass circuit 62 comprises an ammonia generator 20, which is in fluid communication with valve 34. By-pass circuit 64 comprises an ammonia generator 20, which is in fluid communication with valve 34. Valve 34 is capable of directing, connecting, or impeding flow to any of the conduits that are connected thereto. Reformer 26 is in fluid communication with valve 34 via reformer conduit 36. Valve 34 is in fluid communication with SCR 28, which is in fluid communication with the environment 30.

During normal operating mode, valve 34 couples by-pass circuit 62 to SCR 28 in fluid communication and closes fluid communication of by-pass circuit 64 with by-pass circuit 62 and SCR 28. However, valve 34 connects reformate conduit 36 in fluid communication with by-pass circuit 64. Hence, exhaust stream 10 is capable of passing through by-pass circuit 62, through ammonia generator 20, through valve 34, through SCR 28, and to the environment 30, and in a separate fluid circuit, reformate from reformer 26 is capable of passing through reformate conduit 36, through valve 34, into by-pass circuit 64, and into ammonia generator 20.

When in this configuration, reformer 26 produces reformate that is advanced into by-pass circuit 64 as controlled by valve 34. Reformate flows opposite the normal flow direction of exhaust stream 10 (i.e., flows upstream in direction of broken arrow 42). As reformate advances towards ammonia generator 20, the hydrogen and carbon monoxide rich reformate react with any oxygen within the exhaust inside the conduits to form water and carbon dioxide, as shown by reactions (III) and (IV). Reformate continues to flow from the reformer advancing the reformate flow front further. Once inside the ammonia generator 20, oxygen is consumed, the catalyst bed 8 releases NOx, and ammonia production is initiated in the presence of the catalyst, as shown in reactions (VI) and (VII).

After a period of time, a sufficient amount NOx has been released from the catalyst bed 8, ammonia has been produced, and the regeneration cycle is complete. At this point, valve 34 couples by-pass circuit 64 in fluid communication with SCR 28 and connects reformate conduit 36 in fluid communication with by-pass circuit 62. This is the opposite configuration of the prior regeneration cycle. This configuration allows reformate to advance into by-pass circuit 62 to regenerate the ammonia generator 20 located therein.

As regeneration of by-pass circuit 62 begins, the gases in by-pass circuit 64 are advanced through valve 34 and through SCR 28 by exhaust stream 10. Reformate remaining in by-pass circuit 64, then ammonia produced in the ammonia generator 20 will enter SCR 28 prior to the unconverted NOx within by-pass circuit 64 and NOx in the exhaust stream 10.

As previously discussed, this system configuration provides the ammonia rich reformate to regenerate SCR 28 prior to exposure to the NOx gases which follow. This order of exposure reduces the potential of SCR 28 allowing any unreacted NOx to "slip" through the device.

An embodiment in this configuration uses two ammonia generators 20 (e.g., two smaller ammonia generators than would be employed for a similar system (flow rates and the like), employing the configuration of FIG. 2, for example. Although an additional device has been added, it is believed this system is an efficient design and produces an unforeseen benefit.

As a result of this configuration, longer regeneration cycle times may be allotted to each ammonia generator 20, thereby enabling the use of less expensive catalysts, which significantly reduces the cost of unit. Furthermore, this configuration allows for alternating regeneration cycles between the by-pass circuits, which allows for continuous operation of reformer 26. As a result, reformer efficiency losses caused by changes to steady-state operation are eliminated or reduced.

The embodiments disclosed are rudimentary for purposes of clarity and brevity. It is apparent that the embodiments disclosed can incorporate process control devices to govern the frequency and duration of the regeneration cycles. In addition, these process control devices can also include capabilities to operate based on predetermined values or calculate or determine optimal operating conditions based on stored data or feedback gathered from the operation of the process such as, but not limited to, NOx concentration, oxygen concentration, reformate concentration, temperature, flow rate, engine RPM's, engine load, valve position, and the like.

The illustrated systems can incorporate additional exhaust emission treatment device(s) and/or various sensor(s), controller(s), and the like, arranged in any manner, to further increase NOx abatement. Some possible devices include adsorber(s) (e.g., SOx, NOx, and the like), oxidation catalyst(s), plasma reactor(s), burner(s), flame suppressor(s), filter(s) (e.g., particle filter(s), and the like), purifier(s), exhaust gas recirculation circuit(s), accumulator(s), SCR(s), and the like, as well as combinations comprising at least one of the foregoing devices. Possible sensor(s) can comprise, oxygen sensor(s), NOx sensor(s), ammonia sensor(s), temperature sensor(s), pressure sensor(s), flow sensor(s), and the like, as well as combinations comprising at least one of the foregoing sensors. More specifically, combinations of these sensors may be incorporated to measure upstream and downstream of a specific device or circuit to monitor efficiency.

The ammonia generating device and system disclosed herein can incorporate a valve and a by-pass circuit that are capable of removing the ammonia generator from the exhaust stream during an ammonia generating cycle. During the ammonia generating cycle reformate can be flowed through the device in a direction opposite the normal flow direction through the device. This results in the ability to regenerate the SCR with ammonia prior to exposure to additional NOx gases when exhaust flow is resumed through the device. This inhibits "NOx slip" from the device. Also, by generating ammonia "off-line" (i.e., while the exhaust flow is diverted around the ammonia generator), the size of the ammonia generator can be reduced as a result of increased ammonia generating cycle times. This results in less cost as a even lower amount of expensive catalytic metals are required. Furthermore, "off-line" ammonia generation uses less reformate to create the fuel-rich environment, resulting in greater system efficiency.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An ammonia generator, comprising:
    a shell; and
    a catalyst bed housed within said shell; wherein said catalyst bed comprises a substrate and a catalyst,
    wherein said catalyst comprises a catalytic metal capable of reacting NOx and hydrogen to form ammonia, and a material capable of adsorbing NOx;
    wherein said catalytic metal comprises about 100 g/ft$^3$ to about 260 g/ft$^3$ ruthenium, and about 10 g/ft$^3$ to about 50 g/ft$^3$ to platinum.

2. The generator of claim 1, wherein said catalytic metal further comprises less than or equal to about 5 g/ft$^3$ rhodium and less than or equal to about 5 g/ft$^3$ palladium.

3. The generator of claim 1, wherein said catalytic metal comprises no added rhodium and no added palladium.

4. The generator of claim 1, wherein said ammonia generator is capable of converting about 20 vol % to about 75 vol % of NOx to ammonia, based upon a total volume of NOx in an exhaust stream.

5. The generator of claim 4, wherein said ammonia generator is capable of converting about 30 vol % to about 65 vol % of NOx to ammonia, based upon a total volume of NOx in an exhaust stream.

6. The generator of claim 5, wherein said ammonia generator is capable of converting about 40 vol % to about 55 vol % of NOx to ammonia, based upon a total volume of NOx in an exhaust stream.

7. The generator of claim 1, wherein said material comprises neodymium.

8. A NOx abatement system, comprising:
    an ammonia generator comprising an inlet end and an outlet end
    an exhaust conduit connected in fluid communication to said inlet end;
    a mixture conduit connected in fluid communication to said outlet end;
    a by-pass circuit connected in fluid communication to said exhaust conduit on a first end and connected in fluid communication to said mixture conduit on a second end;
    a reformer connected to said mixture conduit; and,
    a valve capable of directing and inhibiting a flow of fluids, wherein said valve is disposed in said mixture conduit at a position capable of inhibiting flow of a fluid stream from said by-pass circuit into said ammonia generator and capable of directing reformate from said reformer into said ammonia generator.

9. The NOx abatement system of claim 8, further comprising a selective catalytic reduction catalyst connected to said mixture conduit downstream from said by-pass conduit.

10. The NOx abatement system of claim 8, wherein said ammonia generator comprises
    a shell; and
    a catalyst bed housed within said shell; wherein said catalyst bed comprises a substrate and a catalyst,
    wherein said catalyst comprises a catalytic metal capable of reacting NOx and hydrogen to form ammonia, and a material capable of adsorbing NOx;
    wherein said catalytic metal comprises about 100 g/ft$^3$ to about 260 g/ft$^3$ ruthenium, and about 10 g/ft$^3$ to about 50 g/ft$^3$ to platinum.

11. The NOx abatement system of claim 10, wherein said catalytic metal further comprises less than or equal to about 5 g/ft$^3$ rhodium and less than or equal to about 5 g/ft$^3$ palladium.

12. The NOx abatement system of claim 11, wherein said catalytic metal comprises no added rhodium and no added palladium.

13. A method of operating a NOx abatement system, comprising:
    introducing an exhaust stream to an ammonia generator in a normal flow direction;
    adsorbing NOx from said exhaust stream in said ammonia generator;
    diverting said exhaust stream around said ammonia generator;

introducing hydrogen to said ammonia generator in a direction opposite said normal flow direction; and generating ammonia within said ammonia generator.

14. The method of claim 13, further comprising ceasing said diversion of said exhaust stream and introducing said ammonia to a selective catalytic reduction catalyst.

15. The method of claim 13, further comprising converting about 20 vol % to about 75 vol % of said NOx to said ammonia, based upon a total volume of NOx in said exhaust stream.

16. The method of claim 15, comprising converting about 30 vol % to about 65 vol % of said NOx.

17. The method of claim 16, comprising converting about 40 vol % to about 55 vol % of said NOx.

18. The method of claim 13, further comprising forming said hydrogen in a reformer.

19. The method of claim 13, wherein said ammonia generator comprises a shell; and a catalyst bed housed within said shell; wherein said catalyst bed comprises a substrate and a catalyst, wherein said catalyst comprises a catalytic metal capable of reacting NOx and hydrogen to form ammonia, and a material capable of adsorbing NOx;

wherein said catalytic metal comprises about 100 $g/ft^3$ to about 260 $g/ft^3$ ruthenium, and about 10 $g/ft^3$ to about 50 $g/ft^3$ to platinum.

20. The method of claim 19, wherein said catalytic metal further comprises less than or equal to about 5 $g/ft^3$ rhodium and less than or equal to about 5 $g/ft^3$ palladium.

* * * * *